O. ZERK.
LUBRICATING SPRING BOLT.
APPLICATION FILED JAN. 18, 1913.

1,066,970.

Patented July 8, 1913.

WITNESSES:
Justin W. Machlin
Gertrude K. Smith

INVENTOR
Oscar Zerk,
BY Albert K. Baker,
ATT'Y

UNITED STATES PATENT OFFICE.

OSCAR ZERK, OF CLEVELAND, OHIO, ASSIGNOR TO THE ZERK MANUFACTURING COMPANY, OF CLEVELAND, OHIO, A CORPORATION OF OHIO.

LUBRICATING SPRING-BOLT.

1,066,970.  Specification of Letters Patent.  Patented July 8, 1913.

Application filed January 18, 1913. Serial No. 742,859.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Lubricating Spring-Bolts, of which the following is a full, clear, and exact description, reference being had to the accompanying drawings.

This invention relates to lubricating spring bolts of the type wherein there is a grease cup carried at the head of the bolt, and the general object is to provide a simple, effective and attractive device of this character.

A more specific object is to provide a threaded head on the bolt which may conveniently carry the grease cup when in position, but shall be so formed that the bolt may be driven into place, without damaging the threaded portion.

Still another object is to provide a compact and simple means for preventing the bolt turning.

Figure 1:
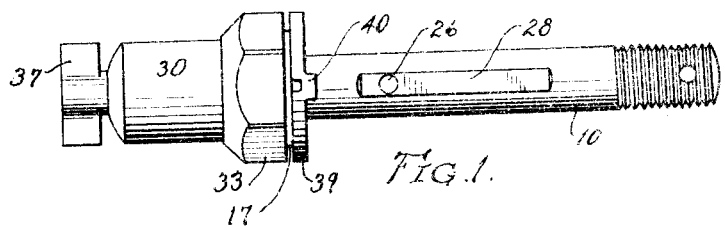
Figure 2:
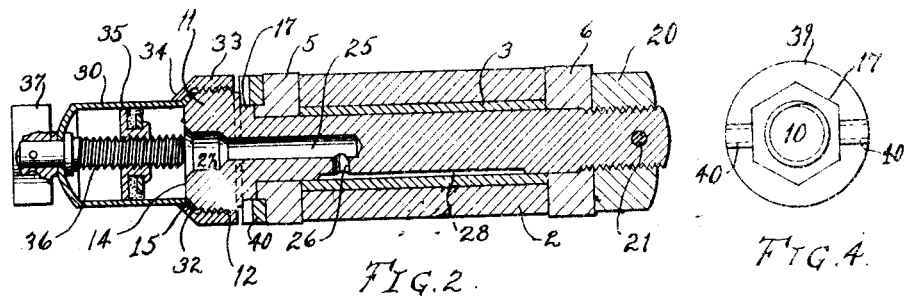
Figure 4:
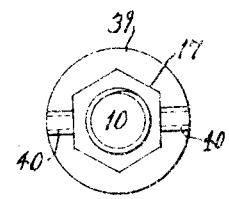
Figure 5:
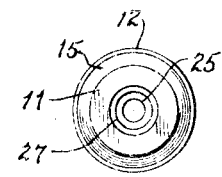
Figure 3:
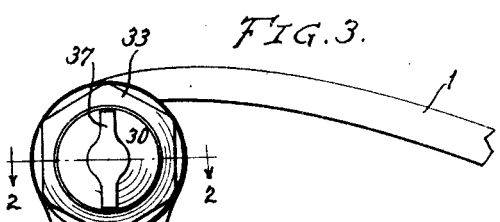
Figure 6:
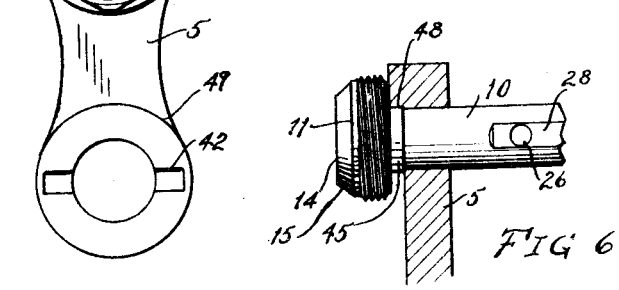
Figure 7:
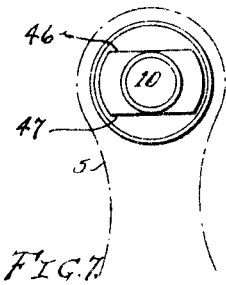

In the drawing, Figure 1 is a side elevation of the bolt, showing the grease cup in position and showing a locking washer which may be employed. Fig. 2 is a horizontal axial section through my spring bolt showing it in place in the eye of a spring between the two shackles or links. Fig. 3 is an end elevation of the spring bolt showing one of the shackles and a portion of one of the leaf springs. Fig. 4 is an elevation of the other end of the bolt, showing also the lock washer. Fig. 5 is an end elevation of the head of the bolt with the grease cup removed. Figs. 6 and 7 show a modification of the locking device, Fig. 6 being a side elevation of a portion of the bolt, showing the head, and Fig. 7 an end elevation, in which the outline of the shackle is indicated by a dot and dash line.

Referring to the parts by numerals, 1 indicates the leaf of a spring, and 2 the end portion thereof which is curled to form an eye for receiving the bolt. In this eye 2 is preferably snugly fitted a bearing sleeve 3. 5 and 6 in Fig. 2 indicate two shackle plates, or two arms of a single shackle, or two ears formed on the edges of a coöperating spring, as the case may be.

10 indicates the shank of the bolt, and 11 the head of the bolt which is preferably integral therewith and externally screw threaded at 12, and has a flat transverse surface 14, which is beveled at its outer edge 15 to allow the bolt to be driven by striking the surface 14 without mutilating the threads 12, and to provide a suitable seat for a grease cup, as will be hereinafter described. The bolt 10 passes through the shackle 5 and 6 and the sleeve 3 in the end of the spring, thus forming a pivotal connection between the shackle and the spring. The other end of the bolt 10 is threaded for a suitable distance to receive a nut 20, which may be locked by a suitable cotter pin 21 in the usual manner.

Leading from the head 11 to a point opposite the bearing of the sleeve 3 is an axial cavity or hole 25 which meets at its inner end a radial hole 26. To provide for the distribution of oil on the bearing surface, the bolt is slightly flattened, as at 28, for nearly the whole length of the bearing surface on the side coincident with the hole 26. The cavity 25 is enlarged at its outer end 27, as shown, to provide an easy passage for grease to the smaller bore 25.

30 in the drawing, indicates the grease cup proper, which has a cylindrical wall and a flaring inclined flange 32, resting upon the beveled surface 14 of the bolt head. This cup is held in place by a nut 33, screwing onto the threads 11 and having an inwardly bent inclined flange 34, which fits around the cylinder portion 30 and engages the flange 32. This cup 30 has a thumb screw journaled in its outer end, which is adapted when turned, to move the plunger 35, inside the cup 30, to force the grease into the bores 27 a d 25, and out through the opening 26 to the bearing surface.

When empty, the cup may be removed by unscrewing the nut 33, the handle 37 of the thumb screw being small enough so that the nut may pass over it. Then by screwing the plunger 35 back to the closed end of the cup 30, the cup may be filled with suitable grease at its open end, when it is again placed on the bolt with the flange 32 seating on the beveled surface 15, as shown, and the nut 33 screwed into position to hold it.

To prevent the bolt turning, so that the oil passage 26 may be kept horizontal, I may provide the lock washer 39 shown in Figs. 1, 2 and 4. This washer has hexagonal or angular central openings embracing an angular portion 17 on the bolt, and has diametrically opposite humps 40, made by pressing them into the shape shown. These humps engage suitable grooves in the shackle 5, two of such grooves being shown at 42 in Fig. 3.

A modification of the angular shoulder 17 upon the bolt head is shown in Figs. 6 and 7, in which the shoulder 45 is rounded, but has two sides flattened, as at 46 and 47. The raised or thickened annular portion of the usual shackle is cut away to provide a surface 48 against which one of the surfaces 47 may lie to prevent the bolt turning.

It will be seen from the foregoing description that I have a simple and neat device which is dust proof and easily accessible for purposes of refilling, etc., while the bolt is of such construction that it is cheap to manufacture and may be readily driven into place without in any way injuring it or impairing its use.

Having thus described my invention, what I claim is:

1. The combination, with a bolt and an open-ended cap, of a flange coupling for securing the cap to the head of the bolt, and a movable plunger within the cap.

2. The combination of a bolt having a head and an opening through the head and the body of the bolt to the surface of the bolt shank, a cap having an open-ended body, a flange coupling for securing the body to the head, a plunger within the body, and means for moving said plunger.

3. The combination of a bolt having a shank and an enlarged head externally threaded, a cap bearing against the head and externally flanged, and an internally flanged nut screwing onto the head and engaging the flange of the cap.

4. The combination of a bolt having a shank and an enlarged head, a portion of which is beveled forming an annular beveled surface, a cap having a flange fitting against said beveled surface, and a nut screwing onto the head and having an inward flange for engaging the flange on the cap for holding the cap in place.

5. The combination of a bolt having a shank and an enlarged head externally threaded, an opening through the head and body of the bolt leading to the side surface of the bolt, said bolt head having a substantially flat outer face and a beveled annular portion between the outer face and threads, a cap having an open end, and an outward inclined annular flange at its edge, and a nut adapted to screw onto said head and having an inward inclined annular flange adapted to overhang the flange of the cap and clamp it to the bolt head.

6. The combination of a bolt having a shank, a rigid head and an angular shoulder on the inner face of the head, an open-ended cap, and a flange coupling for securing the same to the head.

7. The combination of a bolt having a head rigid therewith, said head having a screw threaded exterior, a cap, a nut by which the cap is held on the head, an angular shoulder on the bolt adjacent to the head, and means for locking the shoulder to the shackle.

8. The combination, with a spring, of a bolt occupying an eye in the spring and having a cavity leading from the end to the side surface to lubricate the spring bearing, an open-ended cap, and a flange coupling for securing the cap to the head of the bolt.

9. The combination, with a spring, of a bolt having a shank occupying the spring and having an enlarged head beyond the side of the spring and externally threaded, a cap bearing against the head and externally flanged, and an internally flanged nut screwing onto the head and engaging the flange of the cap.

10. The combination of a spring bolt having a shank and a head, a beveled seat on the head, a cap having a flaring flange fitting over such seat, there being screw threads on the outside of the head, and a nut screwing on such threads having a flange engaging the flange on the cup for holding it onto said beveled seat, there being an opening through the head of the bolt to the side thereof, and means for holding the bolt against turning.

In testimony whereof, I hereunto affix my signature in the presence of two witnesses.

OSCAR ZERK.

Witnesses:
 ALBERT H. BATES,
 BRENNAN B. WEST.